(12) United States Patent
Reed et al.

(10) Patent No.: US 8,429,145 B2
(45) Date of Patent: Apr. 23, 2013

(54) SYNDICATING HUMOR

(75) Inventors: Benjamin C. Reed, Morgan Hill, CA (US); Philip Bohannon, Cupertino, CA (US); Utkarsh H. Srivastava, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 445 days.

(21) Appl. No.: 11/963,423

(22) Filed: Dec. 21, 2007

(65) Prior Publication Data
US 2009/0164451 A1 Jun. 25, 2009

(51) Int. Cl.
*G06F 17/30* (2006.01)

(52) U.S. Cl.
USPC .......................................................... 707/706

(58) Field of Classification Search ............ 707/706, 707/999.3, 999.102
See application file for complete search history.

(56) References Cited

U.S. PATENT DOCUMENTS

| | | | |
|---|---|---|---|
| 6,285,987 B1 * | 9/2001 | Roth et al. | 705/14.71 |
| 6,964,608 B1 * | 11/2005 | Koza | 463/9 |
| 7,319,998 B2 * | 1/2008 | Marum Campos et al. | 1/1 |
| 7,477,909 B2 * | 1/2009 | Roth | 455/466 |
| 2001/0034635 A1 * | 10/2001 | Winters | 705/10 |
| 2002/0103788 A1 * | 8/2002 | Donaldson et al. | 707/3 |
| 2002/0128056 A1 * | 9/2002 | Kato | 463/9 |
| 2003/0078913 A1 * | 4/2003 | McGreevy | 707/3 |
| 2003/0088554 A1 * | 5/2003 | Ryan et al. | 707/3 |
| 2004/0148224 A1 * | 7/2004 | Gauthier et al. | 705/14 |
| 2005/0080775 A1 * | 4/2005 | Colledge et al. | 707/3 |
| 2005/0096979 A1 * | 5/2005 | Koningstein | 705/14 |
| 2005/0256766 A1 * | 11/2005 | Garcia et al. | 705/14 |
| 2006/0020591 A1 * | 1/2006 | Kommers et al. | 707/3 |
| 2006/0080303 A1 * | 4/2006 | Sargent et al. | 707/3 |
| 2006/0161488 A1 * | 7/2006 | Satou | 705/35 |
| 2006/0224552 A1 * | 10/2006 | Riezler et al. | 707/1 |
| 2006/0224938 A1 * | 10/2006 | Fikes et al. | 715/500 |
| 2007/0005590 A1 * | 1/2007 | Thrasher | 707/5 |
| 2007/0016559 A1 * | 1/2007 | Kraft | 707/3 |
| 2007/0050353 A1 * | 3/2007 | Ekberg et al. | 707/5 |
| 2007/0174244 A1 * | 7/2007 | Jones | 707/3 |
| 2007/0198500 A1 * | 8/2007 | Lucovsky et al. | 707/4 |
| 2007/0239713 A1 * | 10/2007 | Leblang et al. | 707/6 |
| 2008/0040329 A1 * | 2/2008 | Cussen et al. | 707/3 |
| 2008/0215553 A1 * | 9/2008 | Badros et al. | 707/3 |

OTHER PUBLICATIONS

Jones et al., Generating query substutions, 2003, 10pages.*

* cited by examiner

*Primary Examiner* — Robert Beausoliel, Jr.
*Assistant Examiner* — Noosha Arjomandi
(74) *Attorney, Agent, or Firm* — Hickman Palermo Truong Becker Bingham Wong LLP

(57) ABSTRACT

A method and apparatus for altering a page presenting search results is provided. The query dispatcher receives one or more query terms. Based on the query terms, the search engine generates a set of search results and advertisements. A parallel search dispatched by entertainment rating and selection engine generates a set of content items based on the one or more query terms and an additional one or more constraint terms. The entertainment item rating and selection engine selects a content item from the set of content items. The selection may be random, based on past user responses, or responses of users belonging to particular clusters. The entertainment item injector then replaces one of the search results or advertisements with the content item. The content item is presented to the user on a search results page. The content item contains a feedback mechanism to collect user responses. The entertainment item rating and selection engine then derives the quality of the entertainment item from the collected user responses.

24 Claims, 4 Drawing Sheets

US 8,429,145 B2

SYNDICATING HUMOR

FIELD OF THE INVENTION

The present invention relates to generating search results and, more specifically, to supplementing search results with entertainment items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search engine providers derive a large portion of their revenue from advertisements. In order to increase revenue, search engine providers must both attract new users and compel the existing users to look at advertisements. One major factor attracting users to any particular search engine provider has been the quality of search results. However, search engines are rapidly improving the quality of search results and it is conceivable that eventually major search engine providers will not be able to be differentiated on the quality of search results alone.

Search engine providers use approaches based on factors other than the quality of search results in order to attract users. In one prior approach, users were paid to use a certain search engine. However, this approach directly hurt the profitability of the search engine service and was not viable in the long term. In another approach, layouts of search results were altered to direct the user's attention to advertisements. Search engine providers attempted to balance the prominence of search results and advertisements. As a result, search engine providers established an implicit layout standard, where search engine results are presented on the left and the advertisements are presented on the right. Within the implicit layout standard, the designers are faced with a challenge of attracting existing users to pay attention to the advertisements displayed on the right. In some approaches, the advertisements were mixed with the search results; however this had a negative effect on users because it detracted the users from their search task.

Other approaches attempted to alter the advertisements themselves by embedding games or animation. However, bright, flashy advertisements detract users from the main search task and may make the search result page appear unprofessional. In order to increase viewership of text only ads, search engine providers also altered appearance. Search engine providers also attempted to make the advertisements more relevant to users. The advertisements were matched to the users based on the query terms and user profiles. The relevance based approaches all aim at improving the quality of the match of users to advertisements. However, these approaches are limited by the quality of the ads themselves.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
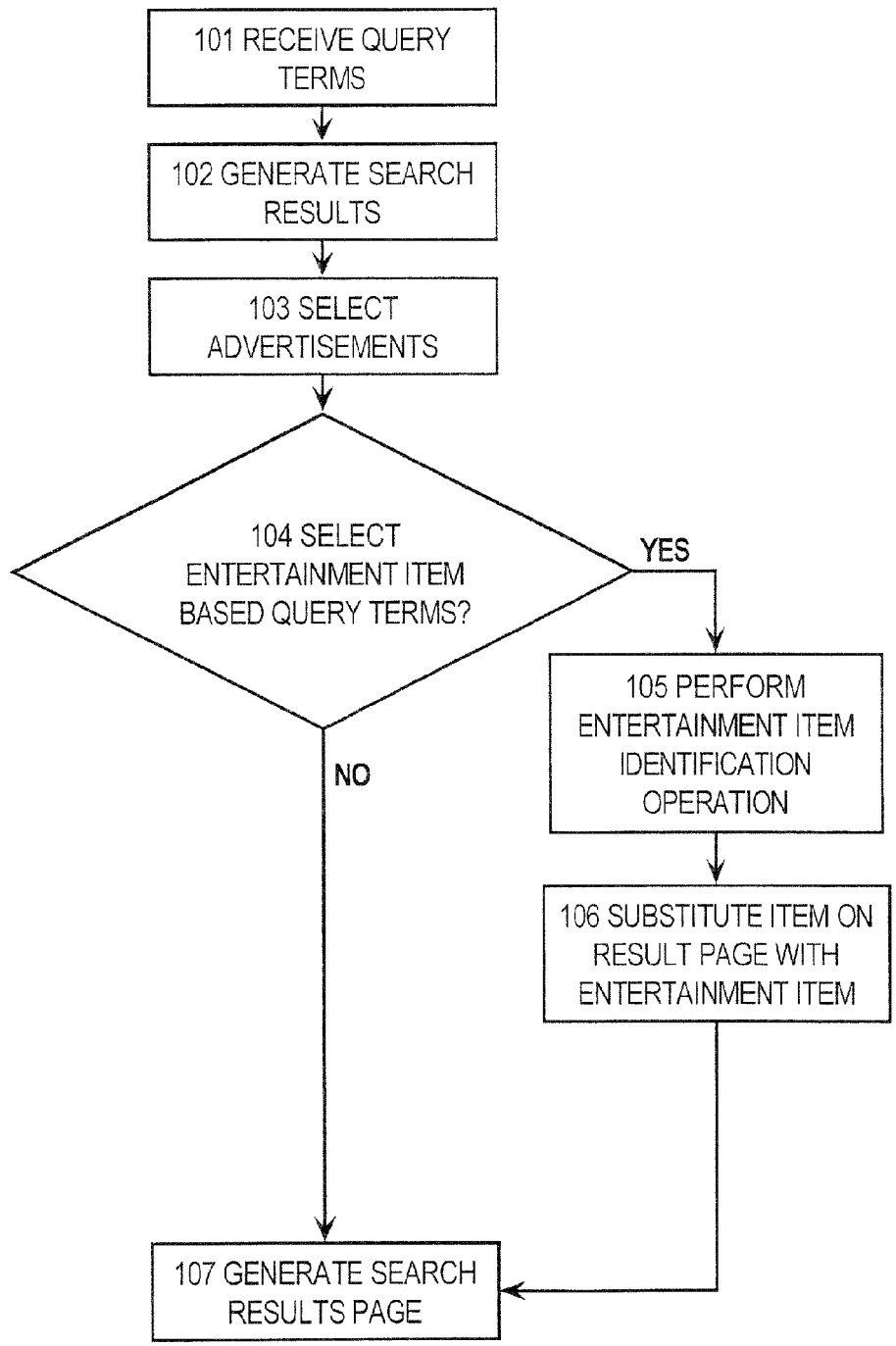
FIG. 1 is flow chart of a means by which an entertainment item is substituted in a search results page according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Currently, when a user performs a search using a commercial search engine, the search engine returns a set of results and relevant advertisements. The results are presented in a layout which is similar across all search engines. The layout consists of a banner advertisement and search engine input box at the top of the page, navigation at the bottom of the page, text advertisements on the right of the page, and a list of results on the left side of the page. The search results and sometimes the advertisements are based on user submitted query terms.

In one embodiment of the invention, a page presenting the search results is altered at certain periods of time in the following manner. One of the ads on the right side of the results page, or a search result, is replaced by an entertainment item. The entertainment items may, in some embodiments, be relevant to the query terms submitted by the user. Therefore, if the entertainment item is a joke, the joke is based on the search query terms submitted by the user. The entertainment item is not limited to jokes. For example, the entertainment item can also be historical facts, trivia etc. The entertainment items may require the user to follow a link or rate the items for quality. The user response is saved and is used in subsequent entertainment item selection process.

In some embodiments, the entertainment items are similar in appearance to the advertisements or the search results they replace. If the entertainment items were to look drastically different, the items would be immediately noticed and the user will not inspect the advertisements. While the entertainment items may be similar in appearance to the items they replace, in on embodiment the entertainment items are displayed in a manner that allows them to be distinguished from the advertisements and search results, so as not to mislead the users to the intent of the item. The distinction may be subtle so that it cannot be easily picked out by the users. When a user discovers an entertainment item, the discovery will generate the feeling of a reward for the user and will cause users to examine the advertisements more closely.

Rather than replacing an item that would otherwise be present in a search results page, the search results page may be supplemented by the addition of one or more entertainment items. The entertainment items may be presented in the same form and format as other items that are conventionally presented on the search results page. For example, the entertainment item may appear among the search result listings in the same form and format as a search result listing. As another example, the entertainment item may appear among the advertisements in the same form and format as the advertisements.

Entertainment Item Substitution Functionality

FIG. 1 is flowchart of a means by which an entertainment item is substituted in a search results page. In step 101, the search engine receives a set of query terms. In step 102, the search engine generates a set of search results based on the query terms. In step 103, a set of advertisements is selected from a pool of available advertisements. The advertisements may be selected based on the query terms. The advertisements can be text-based or graphical. In step 104, the entertainment item substitution component determines whether an advertisement item is a candidate for replacement. Replacement candidates can be set at a fixed frequency, for example every query, or every one millionth query, or alternatively a random number generator is used. If the advertisement item is not to be replaced by an entertainment item, a search results page is generated in step 107.

On the other hand, if the advertisement item is eligible for replacement, in step 105 an entertainment item identification operation is performed to generate a list of entertainment items. In step 106 an entertainment item is selected from the list generated in step 105, and then used as a substitute for the advertisement item. In step 107, the search results generated in step 102, the set of advertisements generated in step 103, and the entertainment item selected in step 106, are assembled into a results page.

As mentioned above, some embodiments may supplement a results page with entertainment items without replacing any existing items. In such embodiments, step 104 is not performed, because no advertisement is being replaced by the entertainment item. Instead, the process may include a step of determining how to format and where to place the entertainment item on the result page.

Entertainment Item Identification and Selection

Referring again to step 105, an entertainment item identification operation may be performed either using the search engine or by using a service distinct from the search engine, for example a social bookmarking site, or a local database. Specifically, in one embodiment of the invention, the entertainment item identification operation involves searching a social networking site using the same query terms that were submitted to the search engine. In addition to the search terms, the search of the social networking site may be further filtered by the addition of a tag "humor". Thus, the search of the social networking site may produce content that (a) has been tagged as "humor", and (b) matches the query terms. Other tags may be used, such as "joke," "funny," "comedy," or "history," without departing from the spirit of the invention.

The list of results returned by the social networking site are humorous in nature and are relevant to the query terms. Social bookmarking sites contain user generated summaries of bookmarked items. The summaries are of comparable length to text-only ads. An item is then chosen from the list based on past user response to the entertainment items, user profiles, or combination of all the approaches. In step 106, an advertisement or a search result may be replaced by an entertainment item selected in step 105. The entertainment is subtly distinguishable from the item that the entertainment replaces. This subtle difference may be created by incorporating a subtle signal to the user, such as a happy face, next to the entertainment item. In all other respects, the item is formatted like an advertisement.

In one embodiment of the invention, the users are presented with an entertainment item which does not require any further action from the user. For example, the entertainment item may be a one liner joke. However, such an implementation limits the size of the entertainment item that can be presented and loses the feedback which can indicate the quality of the entertainment item. Alternatively, an entertainment item requires the user to follow a link. In the event that a user follows link in the summary of the entertainment item, the user is taken to the bookmarked item and is shown the page that was bookmarked with social bookmarking site.

System Implementation

Figure 2:
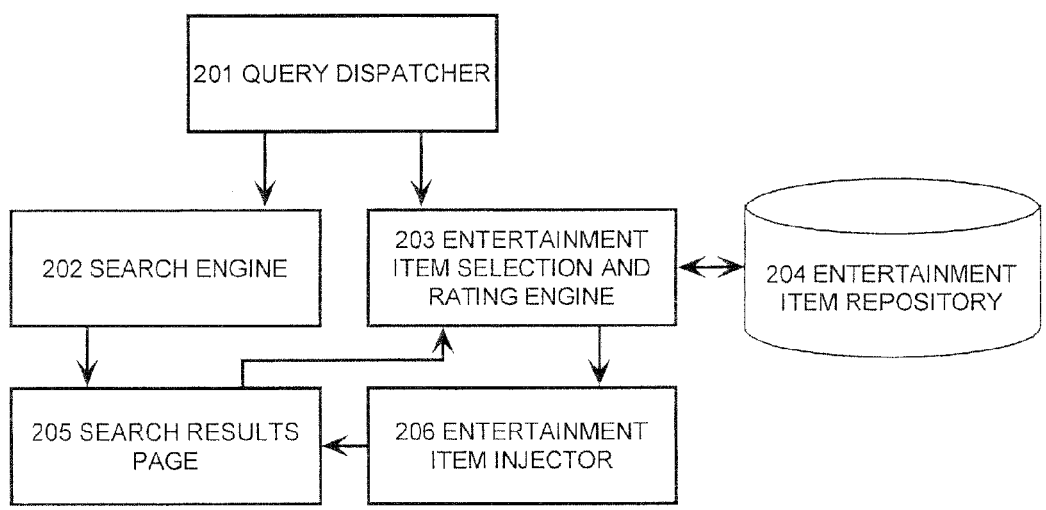
FIG. 2 is a block diagram of entertainment item substitution system according to one embodiment of the invention.

FIG. 2 is a block diagram of entertainment item substitution system according to one embodiment of the invention. Whenever a query is received by the search engine, the query is processed by the query dispatcher 201. The query dispatcher distributes the query terms to the search engine 202 and to an entertainment item selection and rating engine 203. The search engine 202 generates a set of search results and may also select advertisement items based on the query terms. The entertainment rating and selection engine 203 handles selection of entertainment items, collecting ratings for entertainment items and ultimately determines whether an entertainment item is to be substituted for an item contained in the search results page generated by the search engine 202. In the case that an entertainment item is to be substituted for an item contained in the page, the entertainment item selection and rating engine 203 passes the entertainment item to the entertainment item injector 204. The entertainment item injector 204 replaces one of the advertisement items selected by the search engine 202 with the entertainment item. The search results, advertisement items, and the entertainment item are then assembled into a search results page 205. The search results page 205, displays the search results, advertisements, and the entertainment items. The search results page 205 provides a feedback mechanism to the entertainment item selection and rating engine 203.

Rating of Entertainment Items

The entertainment rating and selection engine 203 counts every time a user follows a link in an entertainment item. The frequency with which users follow links in an entertainment item indicates the implicit quality of the entertainment item. The entertainment item is deemed to be good if the user follows the link within the item, and bad if the user does not follow the link in the item. For example an entertainment item may be a joke, and click is required to reveal the punch line. Therefore the jokes receiving the most clicks are deemed the most popular. In situations where users are not clicking a joke, it can either mean that the joke is bad or unpopular, or that the joke presentation is bad. In either case, the lack of user response indicates that the joke should not be shown.

Alternatively, the user may be required to rate each entertainment item on a scale of bad 1 to good 5 explicitly. A sample distribution of user responses is given in FIG. 3. The entertainment item rating is given by the "rating" axis 301. The count of users who rated the entertainment item is given by "users" axis 302. The number of users for who selected each rating is given by graph 303. The area under the graph represents the total number of users who rated the entertainment item. Here a total of 12 users rated the entertainment item. In order to aid calculation, the total number of users and the ratings may be normalized. A threshold 304 is set above which the humor item is displayed to the user.

The distribution of user responses is collected for all users. All the responses may be combined into one distribution for all users or alternatively users may be clustered by demographic characteristics such as age, gender, income, etc. and the distributions are generated based on the responses of users belonging to each cluster. Such an implementation allows for jokes to be customized to particular cluster. So if one joke is found funny by one cluster of users and offensive by another, an implementation which collects responses for user clusters individually readily differentiates between the two.

In another embodiment, instead of using the user demographic information collected by the search engines to cluster the users, user response to entertainment items are used to cluster users. Similarly, the type of jokes presented may be tailored to each unique cluster.

Selection of Entertainment Items Based on Ratings

The entertainment rating and selection engine 203 can use a number of approaches to select an entertainment item. The approaches range from random selection, selection based on outside ratings, and selection based internal user ratings. The entertainment rating and selection engine 203 also rotates in new entertainment items as well as retires old or less popular entertainment items.

In one embodiment of the invention search query terms are used to search a repository of entertainment items. The entertainment rating and selection engine 203 selects the entertainment item that is most relevant to the query terms. Here the entertainment item selection is based solely on relevance of the joke to the search term. Similarly if the entertainment rating and selection engine 203 searches a social bookmarking site for entertainment items, the returned items are relevant to the query terms and have a built in rating provided by the social bookmarking site. The order of the items returned by the social bookmarking site is indicative of popularity and forms a basis whether the item should be shown to people.

In another embodiment of the invention, the selection of entertainment items may be based on user ratings. For example, after a list of entertainment items is generated in step 105, the list is ordered by a ratio of number of clicks to number of showings of an entertainment item. The entertainment item with the highest ratio is then selected.

In another embodiment the selection of an entertainment items may be based on distribution of user ratings and two random number generators. Both random number generators affect whether a humor item is shown or not. The first random number generator dictates the frequency with which entertainment items are eligible to be included within search results. The second random number generator dictates whether an entertainment item is shown or not, based on the prior response of the users to that entertainment item. The second random number is generated based on the expected quality of the entertainment item.

Figure 3:
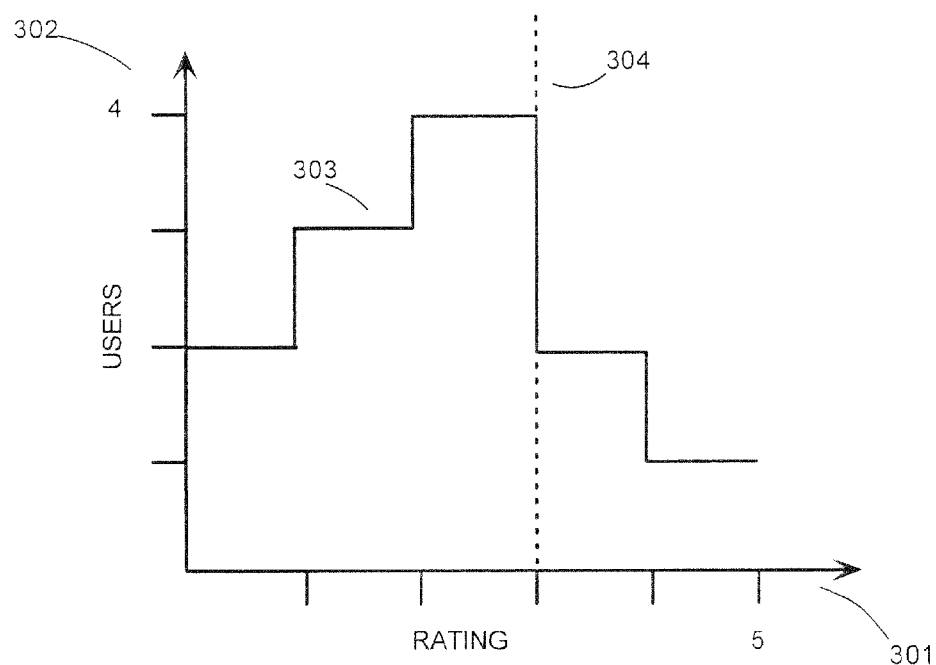
FIG. 3 is a graph of distribution of user responses to an entertainment item and a threshold according to one embodiment of the invention.

For example, if the distribution in FIG. 3 is used to generate the random number, then the possible range of random numbers is 1 to 5. The probability of generating any given number is the number of user responses for that number divided by the total number of users. Therefore, the probability of generating a 4 is 2 out of 12, and the probability of generating a 5 is 1 out of 12. If the generated number is over a threshold, the entertainment item is chosen to be included in the search results. The approach allows for entertainment items that were deemed bad, or for entertainment items that are good, yet were only shown to users who did not notice or did not find the item of interest, to still have a chance to be shown.

In another embodiment, items are selected based in part on the cluster the user belongs to. The distributions of user responses to entertainment items, as illustrated in FIG. 3 are generated from the responses of users belonging to each cluster. As a result, selected items will be based what is preferred by other readers in the same cluster. In one possible embodiment, the user logs in to the search engine. The search engine retrieves user information profile such as gender, age, income, geographic location. The information in the profile determines the group or the cluster the user belongs to. The cluster may be determined off-line and be a part of the information. The user then performs a search for the terms "Britney Spears". The search terms are submitted to social bookmarking site Britney Spears with the addition of a limiting term humor. The social bookmarking site search engine returns a set of links that bookmarked the terms "Britney Spears". For the set of the returned links, there are a set of people that clicked on the links. From the set of people that previously clicked on the links, a link that received the most clicks from people with the same profile as the logged in user is selected. If the link has not been shown previously, the summary of the link is then inserted as a replacement to an advertisement.

The entertainment rating and selection engine 203 also must introduce new content and retire old content. New content is presented by assigning one probability to show entertainment items that have been rated highly, while assigning another probability to entertainment items that have not been rated by users yet. In another embodiment, in addition to the distribution of user responses an element of decay factor is used to lower the ratings of a given entertainment item. The decay factor increases with time, and has the effect of following the user opinion i.e. an item that was entertaining at a certain period in time becomes less entertaining as time passes on and hence the item is eventually removed from the rotation.

Hardware Overview

Figure 4:
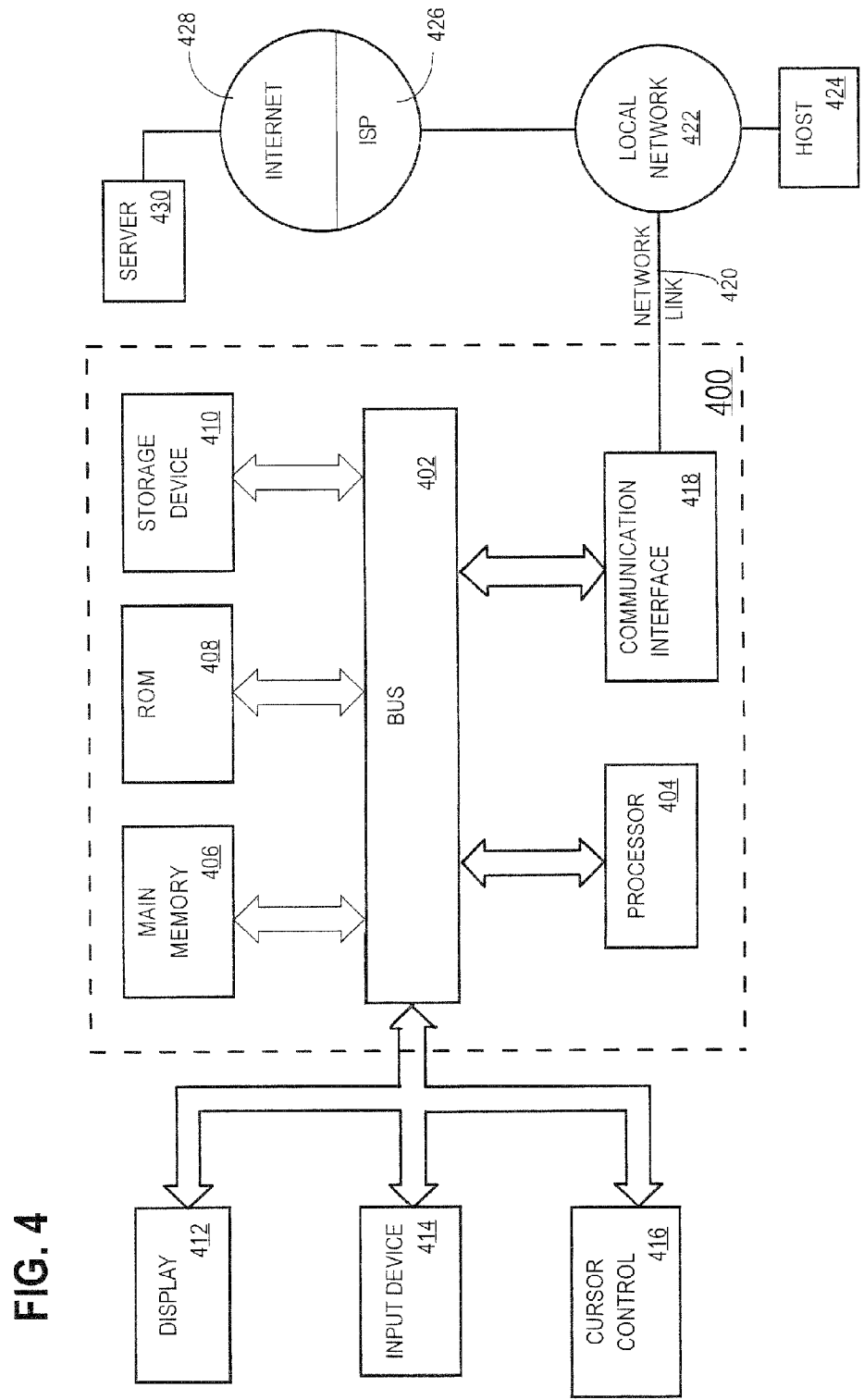
FIG. 4 is a diagram of a computer system upon which the entertainment item substitution system is implemented according to one embodiment of the invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating a search results page, the method comprising:
   receiving a first set of query terms from a particular user; and
   in response to receiving the first set of query terms, performing the steps of:
      based on the first set of query terms, searching a repository for search result items;
      identifying an entertainment item by performing a search with a second set of query terms;
      wherein the second set of query terms includes:
         one or more query terms that are based on the first set of query terms; and
         at least one term, frequently associated with entertainment items, that is selected for inclusion within the second set without regard to the terms of the first set;

wherein said at least one term was not used to search the repository for the search result items;
generating a search results page that includes:
said entertainment item, wherein said entertainment item was identified for inclusion in the search results page using said at least one term, and
said search result items, wherein said search result items were identified for inclusion in the search results page without using said at least one term;
wherein the entertainment item includes a characteristic that distinguishes the entertainment item from the search result items or any advertisement items in the search results page; and
sending the search results page to the particular user for presentation of the search results page to the particular user,
wherein the method is performed by one or more computing devices.

2. The method of claim 1, wherein the step of identifying an entertainment item by performing a search with a second set of query terms is performed based, at least in part, on a cluster to which the particular user belongs.

3. The method of claim 2, further comprising determining the cluster to which the particular user belongs based on information contained in a profile of the particular user.

4. The method of claim 2, further comprising determining the cluster to which the particular user belongs based on how the particular user has rated entertainment items that were previously presented to the particular user.

5. The method of claim 2, wherein the step of identifying an entertainment item is performed based, at least in part, on ratings associated with the entertainment items.

6. The method of claim 5, further comprising presenting users with a mechanism by which users rate entertainment items that are presented to the users.

7. The method of claim 1, wherein the entertainment item is formatted similar to the search result items on said page, and presented as a search result item.

8. The method of claim 1, wherein the entertainment item is formatted similar to the advertisement items on said page, and presented as an advertisement item.

9. One or more storage media storing instructions which, when executed by one or more computing devices, cause performance of the method recited in claim 2.

10. One or more storage media storing instructions which, when executed by one or more computing devices, cause performance of the method recited in claim 3.

11. One or more storage media storing instructions which, when executed by one or more computing devices, cause performance of the method recited in claim 4.

12. One or more storage media storing instructions which, when executed by one or more computing devices, cause performance of the method recited in claim 5.

13. One or more storage media storing instructions which, when executed by one or more computing devices, cause performance of the method recited in claim 6.

14. One or more storage media storing instructions which, when executed by one or more computing devices, cause performance of the method recited in claim 7.

15. One or more storage media storing instructions which, when executed by one or more computing devices, cause performance of the method recited in claim 8.

16. One or more storage media storing instructions which, when executed by one or more computing devices, cause performance of the method recited in claim 1.

17. A computer implemented method of altering a page presenting search results, comprising the steps of:
receiving one or more query terms;
generating a first set of items by searching a repository using the one or more query terms, wherein the first set of items comprises search results and advertisements;
generating a set of content items based on the one or more query terms and one or more constraint terms,
wherein the one or more constraint terms are selected without regard to the one or more query terms, and
wherein the one or more constraint terms were not used to search the repository;
selecting a content item from the set of content items;
replacing a particular item from the first set of items with the selected content item; and
presenting a page of search results,
wherein the page of search results contains the selected content item and a subset of the first set of items, and
wherein selected content item includes a characteristic that distinguishes the selected content item from the search result items or any advertisement items in the page of search results;
wherein the method is performed by one or more computing devices.

18. The method of claim 17, wherein the step of generating a set of content items includes generating the set of content items based on content from a social bookmarking site.

19. One or more storage media storing instructions which, when executed by one or more computing devices, cause performance of the method recited in claim 18.

20. The method of claim 17, wherein the step of selecting a content item from the set of content items is based, at least in part, on a rating of the content item.

21. One or more storage media storing instructions which, when executed by one or more computing devices, cause performance of the method recited in claim 20.

22. The method of claim 17, further comprising formatting the selected content item in a manner similar to the particular item.

23. One or more storage media storing instructions which, when executed by one or more computing devices, cause performance of the method recited in claim 22.

24. One or more storage media storing instructions which, when executed by one or more computing devices, cause performance of the method recited in claim 17.

* * * * *